(12) United States Patent
Lechner et al.

(10) Patent No.: US 11,671,639 B2
(45) Date of Patent: *Jun. 6, 2023

(54) SYSTEMS AND METHODS FOR VALUE-BASED PROVISION OF TELEVISION CONTENT IN A HYBRID QUADRATURE AMPLITUDE MODULATION (QAM)/INTERNET PROTOCOL (IP) CONTENT DELIVERY ENVIRONMENT

(71) Applicant: Verizon Patent and Licensing Inc., Basking Ridge, NJ (US)

(72) Inventors: Marcelo D. Lechner, Burlington, MA (US); Glenn Altchek, Lawrenceville, NJ (US); Aakash Chokshi, New York, NY (US); Shashank Shekhar Sharma, Irving, TX (US); Ataqurahman Patil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,245

(22) Filed: Jun. 3, 2022

(65) Prior Publication Data

US 2022/0295130 A1    Sep. 15, 2022

Related U.S. Application Data

(63) Continuation of application No. 17/302,153, filed on Apr. 26, 2021, now Pat. No. 11,368,734, which is a
(Continued)

(51) Int. Cl.
*H04N 21/258* (2011.01)
*H04N 21/45* (2011.01)
(Continued)

(52) U.S. Cl.
CPC ... *H04N 21/25841* (2013.01); *G06Q 30/0261* (2013.01); *H04N 7/17318* (2013.01); *H04N 21/23424* (2013.01); *H04N 21/4524* (2013.01)

(58) Field of Classification Search
None
See application file for complete search history.

(56) References Cited

U.S. PATENT DOCUMENTS 6,615,039 B1    9/2003   Eldering
7,949,565 B1    5/2011   Eldering et al.
(Continued)

*Primary Examiner* — William J Kim

(57) ABSTRACT

A device may receive content data identifying television schedules for content to be provided for viewing in a first geographic location and a second geographic location, and may identify a first available time slot for content in the first geographic location and a second available time slot for content in the second geographic location. The device may identify a first set of content for the first available time slot and a second set of content for the second available time slot, and may assign values to the first and second sets. The device may determine whether the values assigned to the first and second sets satisfy a threshold value, and may cause, when a value of content in the first set fails to satisfy the threshold value, a first client device, in the first geographic location, to obtain replacement content with a value that satisfies the threshold value.

20 Claims, 12 Drawing Sheets

Related U.S. Application Data continuation of application No. 16/746,420, filed on Jan. 17, 2020, now Pat. No. 10,999,616.

(51) Int. Cl.
  *G06Q 30/0251* (2023.01)
  *H04N 7/173* (2011.01)
  *H04N 21/234* (2011.01)

(56) References Cited

U.S. PATENT DOCUMENTS

| | | |
|---|---|---|
| 9,032,435 B2 | 5/2015 | Sargent et al. |
| 2002/0123928 A1 | 9/2002 | Eldering et al. |
| 2004/0148625 A1 | 7/2004 | Eldering et al. |
| 2006/0075449 A1 | 4/2006 | Jagadeesan et al. |
| 2008/0109307 A1 | 5/2008 | Ullah |
| 2008/0134043 A1 | 6/2008 | Georgis et al. |
| 2009/0113468 A1 | 4/2009 | Steelberg et al. |
| 2009/0171780 A1 | 7/2009 | Aldrey et al. |
| 2009/0187939 A1 | 7/2009 | Lajoie |
| 2010/0037255 A1 | 2/2010 | Sheehan et al. |
| 2010/0242079 A1 | 9/2010 | Riedl et al. |
| 2012/0072286 A1 | 3/2012 | Kilar et al. |
| 2012/0109726 A1 | 5/2012 | Ruffini |
| 2012/0304223 A1 | 11/2012 | Sargent et al. |
| 2013/0024889 A1 | 1/2013 | Yan et al. |
| 2013/0042265 A1 | 2/2013 | Copley et al. |
| 2013/0091520 A1 | 4/2013 | Chen |
| 2013/0298147 A1 | 11/2013 | Klein et al. |
| 2015/0040176 A1* | 2/2015 | Hybertson ............ H04N 21/812 725/131 |
| 2015/0264418 A1 | 9/2015 | Jacobs et al. |
| 2015/0289023 A1 | 10/2015 | Richman et al. |
| 2016/0182923 A1 | 6/2016 | Higgs et al. |
| 2017/0150213 A1 | 5/2017 | Cremer et al. |
| 2018/0359502 A1 | 12/2018 | Romwell et al. |
| 2019/0342607 A1 | 11/2019 | Major |
| 2020/0137448 A1 | 4/2020 | Major |
| 2020/0296433 A1 | 9/2020 | Gutman et al. |

* cited by examiner

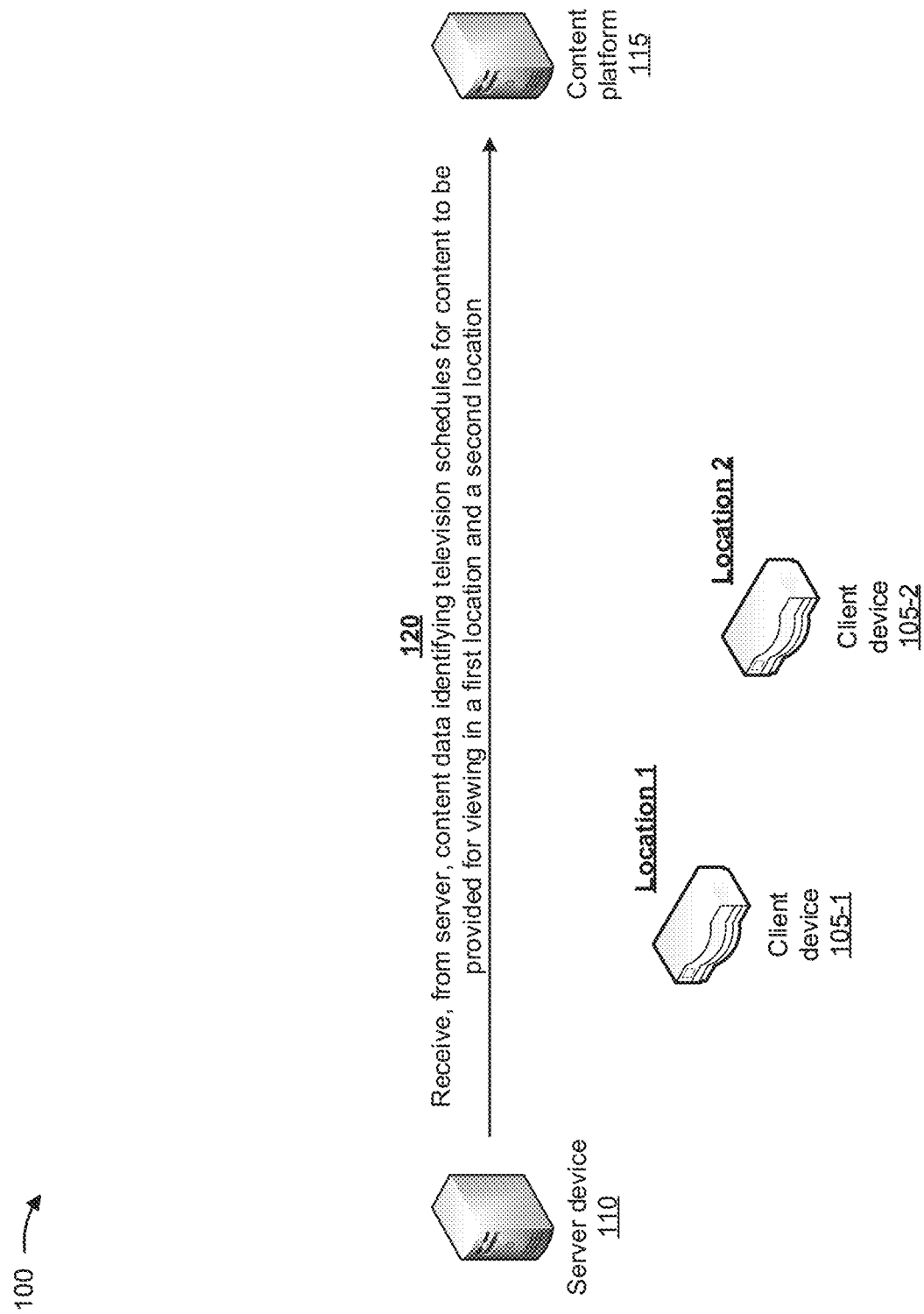

SYSTEMS AND METHODS FOR VALUE-BASED PROVISION OF TELEVISION CONTENT IN A HYBRID QUADRATURE AMPLITUDE MODULATION (QAM)/INTERNET PROTOCOL (IP) CONTENT DELIVERY ENVIRONMENT

RELATED APPLICATION

This application is a continuation of U.S. patent application Ser. No. 17/302,153, entitled "SYSTEMS AND METHODS FOR VALUE-BASED PROVISION OF TELEVISION CONTENT IN A HYBRID QUADRATURE AMPLITUDE MODULATION (QAM)/INTERNET PROTOCOL (IP) CONTENT DELIVERY ENVIRONMENT," filed Apr. 26, 2021 (now U.S. Pat. No. 11,368,734), which is a continuation of U.S. patent application Ser. No. 16/746,420, entitled "SYSTEMS AND METHODS FOR VALUE-BASED PROVISION OF TELEVISION CONTENT IN A HYBRID QUADRATURE AMPLITUDE MODULATION (QAM)/INTERNET PROTOCOL (IP) CONTENT DELIVERY ENVIRONMENT," filed Jan. 17, 2020 (now U.S. Pat. No. 10,999,616), each of which is incorporated herein by reference in its entirety.

BACKGROUND

Television programming distributors (e.g., operating a content platform) may receive a quantity of time (e.g., in minutes) per hour (e.g., a time slot) to utilize television content (e.g., advertisements) for each television channel distributed to subscribers. Content delivery platforms may deliver only a limited number of different television content on a same channel during a same time slot. A quantity of unique content delivered in a single time slot is generally defined by a quantity of geographic locations supported in each market or by a maximum delivery capacity of an content delivery platform.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1B:
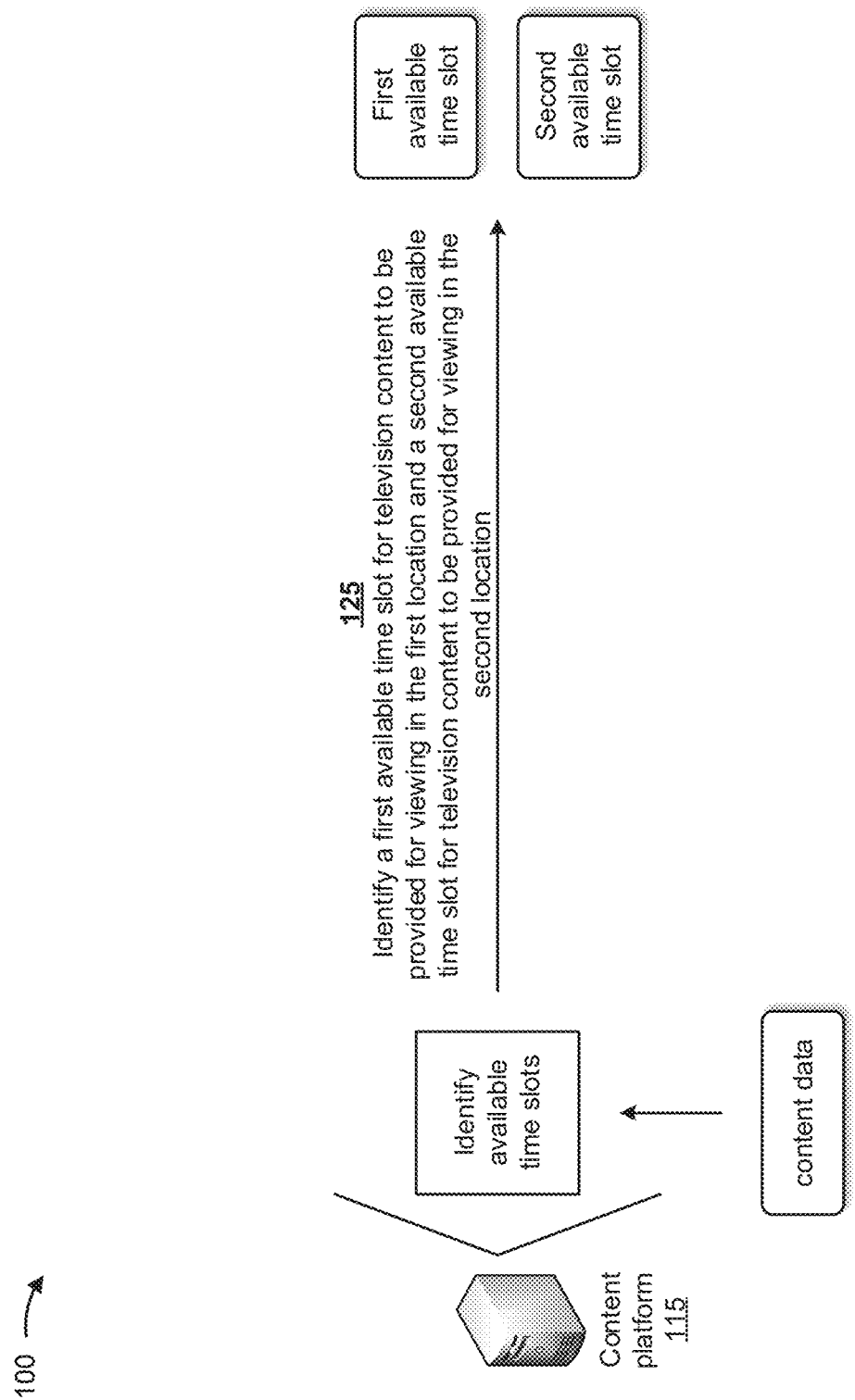

The following detailed description of example implementations refers to the accompanying drawings. The same reference numbers in different drawings may identify the same or similar elements.

When a television content is to be displayed, a set-top box (STB) may receive (e.g., from a content platform) instructions to switch to a hidden black channel provided via quadrature amplitude modulation (QAM) and designated for content. The hidden black channels may include channels that provide content but may not be tuned to (e.g., by a television viewer) via the STB or a remote control for the STB. The STB provides for display (e.g., on a television) the television content provided by the hidden black channel. Once the television content is complete, the STB may tune back to a content channel. The channel changing operation for content insertion may be transparent to the television viewer (e.g., a subscriber).

For time slots to be fully optimized, television content may be scheduled so that every time slot in every geographic location (e.g., a local television viewing region) yields a maximum monetary value for television programming distributors. A time slot in a geographic location may yield maximum monetary value when high value television content are sold for the time slot. In some instances, time slots in one or more geographic locations may include no television content (e.g., due to failure to sell content space). In such instances, the time slots may be filled with a low value television content or a zero value television content. Thus, current techniques for provision of television content waste computing resources (e.g., processing resources, memory resources, communication resources, and/or the like), networking resources, and/or the like, by providing low value television content that are not profitable for television programming distributors, providing zero value television content that cost television programming distributors money, and/or the like.

Some implementations described herein provide a content platform that provides value-based television content in a hybrid QAM/IP content delivery environment. For example, the content platform may receive content data identifying television schedules for content to be provided for viewing in a first geographic location and a second geographic location, and may identify a first available time slot for television content (e.g., advertisements) to be provided for viewing in the first geographic location and a second available time slot for television content to be provided for viewing in the second geographic location. The content platform may identify a first set of television content for the first available time slot and a second set of television content for the second available time slot, and may assign values to the first set of television content and the second set of television content. The content platform may determine whether the values assigned to the first set of television content and the second set of television content satisfy a threshold value, and may cause, when a value of at least one television content in the first set of television content fails to satisfy the threshold value, a first client device, provided within the first geographic location, to obtain a replacement television content with a value that satisfies the threshold value more than the value of the at least one television content in the first set of television content. The content platform may cause the first client device to utilize the replacement television content during the first time slot and for viewing in the first geographic location.

In this way, the content platform provides value-based content in a hybrid QAM/IP content delivery environment. The content platform may maximize a monetary value for television content presented in each geographic location so when a low value or a zero value television content is scheduled, the content platform can replace the scheduled low value or zero value television content with a more valuable television content (e.g., an IP-based unicast television content provided via an STB). Thus, the content platform conserves computing resources, networking resources, and/or the like that would otherwise be wasted in providing low value television content that are not profitable for television programming distributors, providing zero value television content that cost television programming distributors money, and/or the like.

FIGS. 1A-1I are diagrams of one or more example implementations 100 described herein. As shown in FIG. 1A, a first client device 105-1 and a second client device 105-2 may be associated with a server device 110 and a content platform 115. In some implementations, client devices 105 may include STBs, televisions, mobile devices, and/or the like that a user may utilize to view content (e.g., television channels) provided by content platform 115. Client devices 105 may also interact with and/or receive information (e.g., IP-based television content such as content, locations of IP-based television content, and/or the like) from server device 110. Server device 110 may include a device that stores and provides IP-based television content, information identifying locations of IP-based television content, and/or the like. Content platform 115 may include a platform that provides value-based content (e.g., advertisements) in a hybrid QAM/IP content (e.g., advertisement) delivery environment.

As further shown in FIG. 1A, and by reference number 120, content platform 115 may receive, from server device 110, content data identifying television schedules for content to be provided for viewing in a first location (shown as location 1) and a second location (shown as location 2). The first location may be a first geographic location and the second location may be a second geographic location that is different from (e.g., geographically separate from) the first geographic location. Client device 105-1 may be associated with the first location and client device 105-2 may be associated with the second location. Content platform 115 may periodically receive the content data, may continuously receive the content data, may receive the content data based on a request, and/or the like. Content platform 115 may store the content data in a data structure (e.g., a database, a table, a list, and/or the like) associated with content platform 115.

As shown in FIG. 1B, and by reference number 125, content platform 115 may identify a first available time slot for television content to be provided for viewing in the first location and a second available time slot for television content to be provided for viewing in the second location. For example, content platform 115 may identify the first available time slot and/or the second available time slot based on the content data. In some implementations, the first available time slot and the second available time slot may be based on a same time period, a same network, a same television program, and/or the like, but in different locations. In some implementations, the first available time slot may include a first period of time for providing one or more content during provision of first content on a first television channel in the first location. In some implementations, the second available time slot may include a second period of time for providing one or more content during provision of second content on a second television channel in the second location.

Figure 1C:
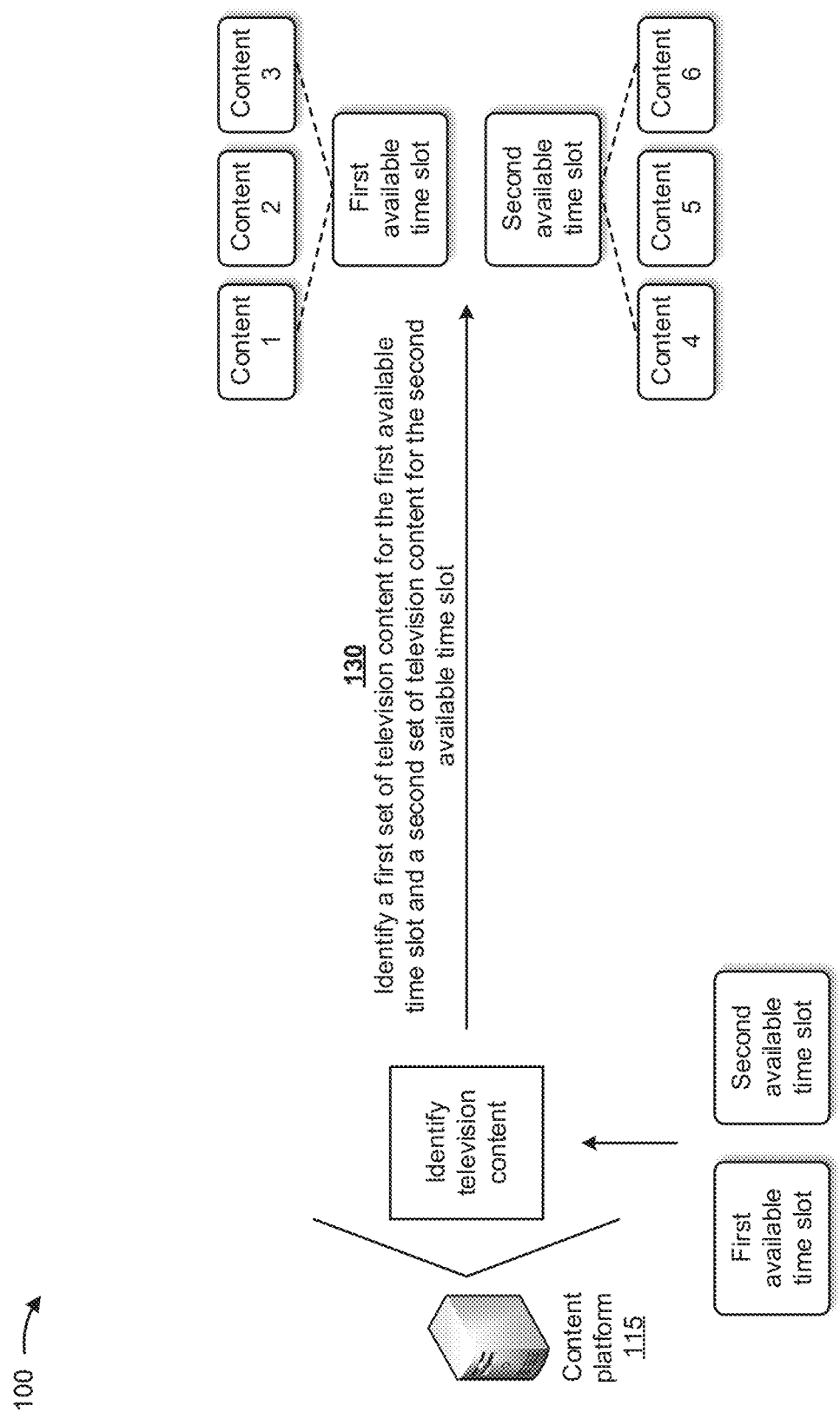

As shown in FIG. 1C, and by reference number 130, content platform 115 may identify a first set of television content for the first available time slot and a second set of television content for the second available time slot. In some implementations, content platform 115 may determine that three television content may be provided during the first available time slot. Thus, content platform 115 may identify a first television content (e.g., content 1), a second television content (e.g., content 2), and a third television content (e.g., content 3) forming the first set of television content. In some implementations, content platform 115 may determine that three television content may be provided during the second available time slot. Thus, content platform 115 may identify a fourth television content (e.g., content 4), a fifth television content (e.g., content 5), and a sixth television content (e.g., content 6) forming the second set of television content.

In some implementations, content platform 115 may process data identifying multiple television content available for the first time slot, with a machine learning model, to identify a quantity of television content to select for the first time slot, to select the first set of television content from the multiple television content, and/or the like. In some implementations, content platform 115 may process data identifying multiple television content available for the second time slot, with the machine learning model, to identify a quantity of television content to select for the second time slot, to select the second set of television content from the multiple television content, and/or the like.

Figure 1D:
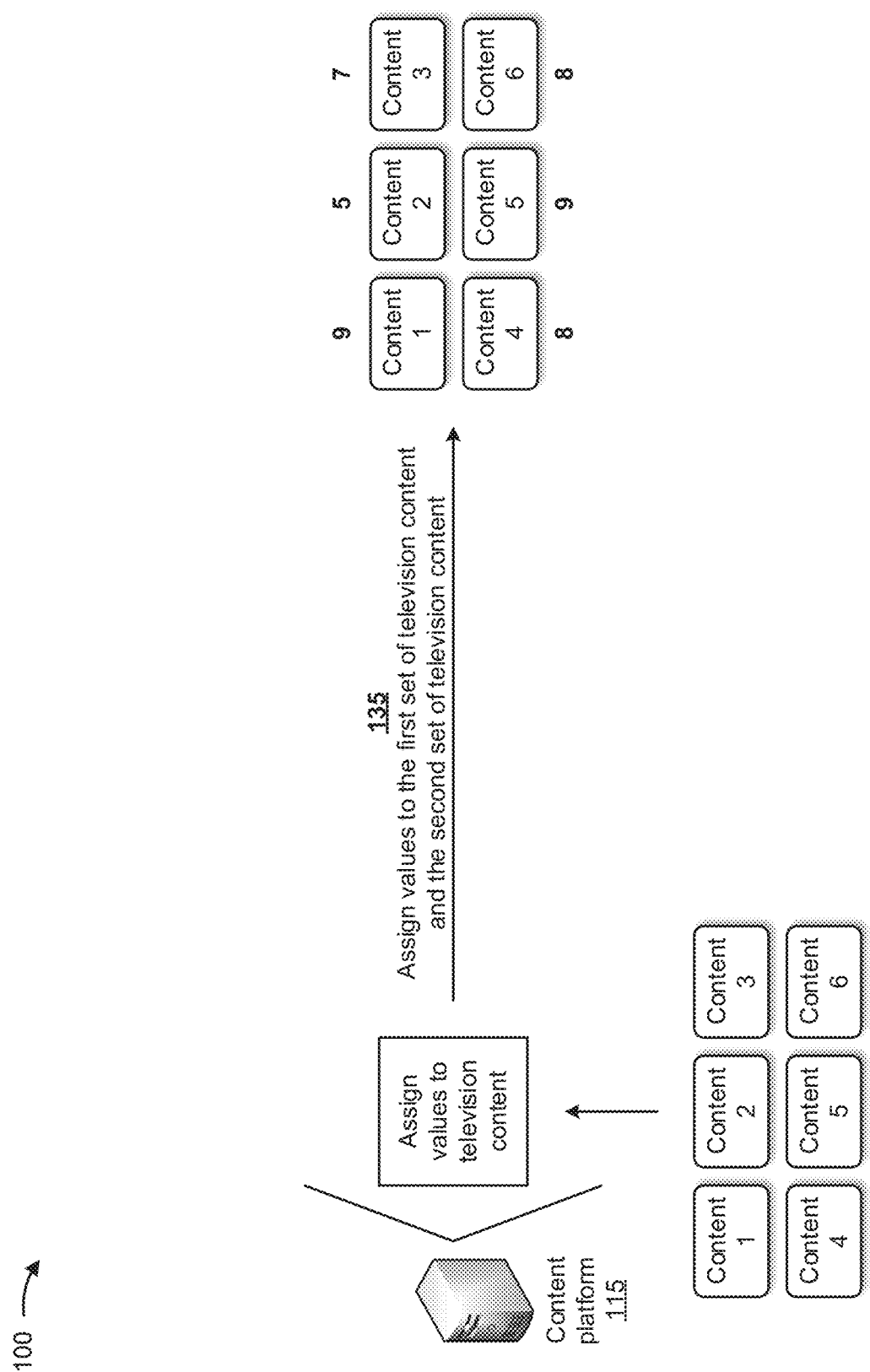

As shown in FIG. 1D, and by reference number 135, content platform 115 may assign values to the first set of television content and the second set of television content. In some implementations, the values assigned to the first set of television content and the second set of television content may be associated with anticipated or potential value (e.g., monetary value, brand awareness value, entity awareness value, and/or the like) of the television content (e.g., for providers of television content during which the television content are to be aired). For example, the values may be based on historical content revenue or viewership associated with the television content, content of the television content, target audiences associated with the television content, and/or the like. In some implementations, the values assigned to the first set of television content and the second set of television content may be based on a numeric range of values (e.g., a scale of 1 to 10, with a higher number indicating a higher anticipated monetary value), may be based on a cost per one thousand impressions (e.g., CPM), may be based on designations identifying value categories (e.g., low values, medium values, and high values), and/or the like.

In some implementations, content platform 115 may process data identifying the first set of television content and historical content revenue data, with a machine learning model, to determine the values to assign to the first set of television content. In some implementations, content platform 115 may process data identifying the second set of television content and the historical content revenue data, with the machine learning model, to determine the values to assign to the second set of television content.

For example, as further shown in FIG. 1D, content platform 115 may assign a value of nine to the first television content, may assign a value of five to the second television content, and may assign a value of seven to the third television content associated with the first set of television content. Content platform 115 may assign a value of eight to the fourth television content, may assign a value of nine to the fifth television content, and may assign a value of eight to the sixth television content associated with the second set of television content.

Figure 1E:
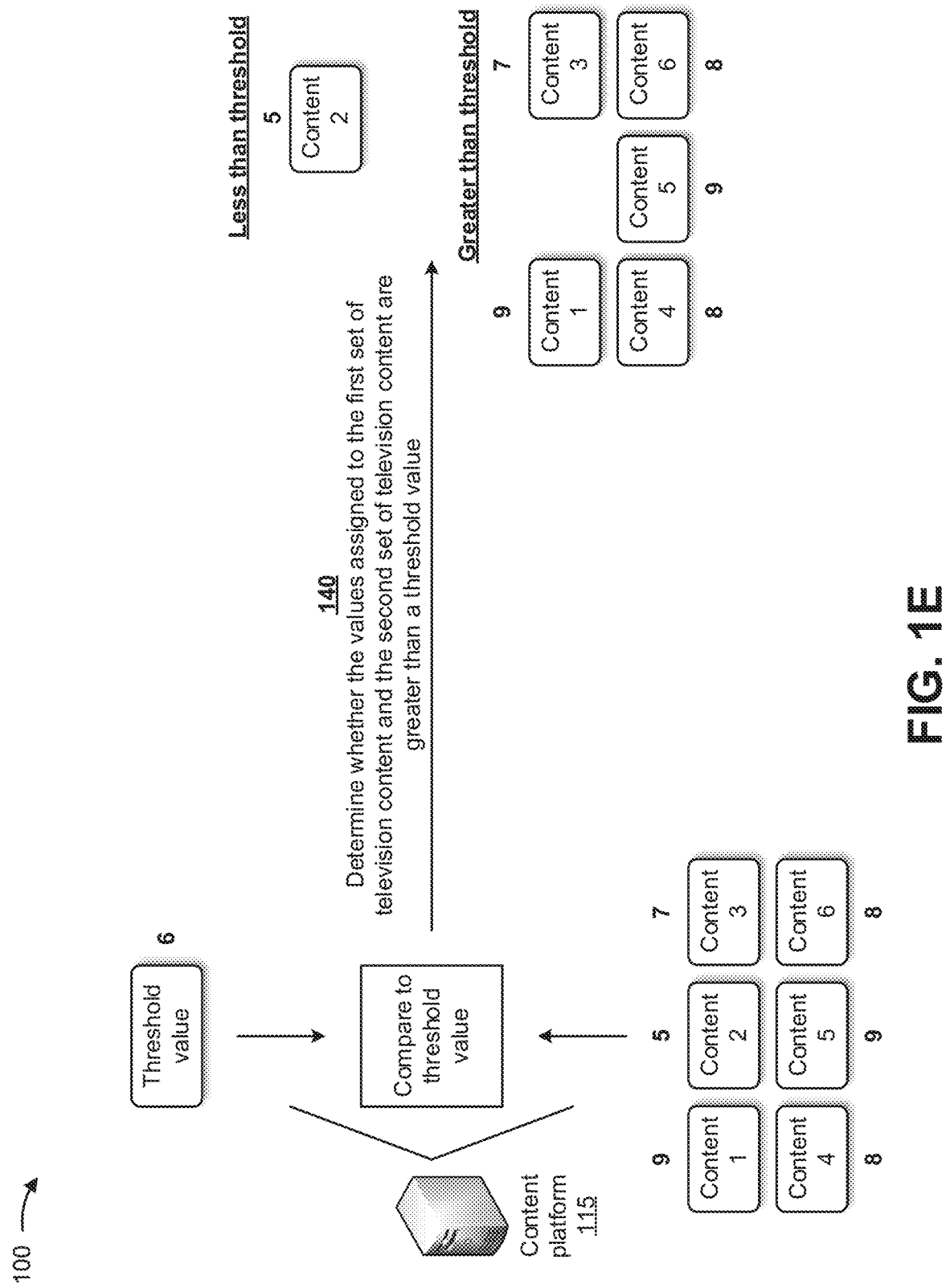

As shown in FIG. 1E, and by reference number 140, content platform 115 may determine whether the values assigned to the first set of television content and the second set of television content satisfy (e.g., are greater than, greater than or equal to, and/or the like) a threshold value. In some implementations, the threshold value may be dynamic value that changes based on time of day, content programming, location of content viewing, and/or the like. In some implementations, content platform 115 may compare each value assigned to each television content with a threshold value (e.g., indicated as six in FIG. 1E), and may determine whether each value satisfies the threshold value. For example, based on a threshold value, content platform 115 may determine that the second television content (e.g., assigned a value of five) fails to satisfy the threshold value (e.g., six). Content platform 115 may also determine that the first television content (e.g., assigned a value of nine), the third television content (e.g., assigned a value of seven), the fourth television content (e.g., assigned a value of eight), the fifth television content (e.g., assigned a value of nine), and the sixth television content (e.g., assigned a value of eight) satisfy the threshold value (e.g., six).

Figure 1F:
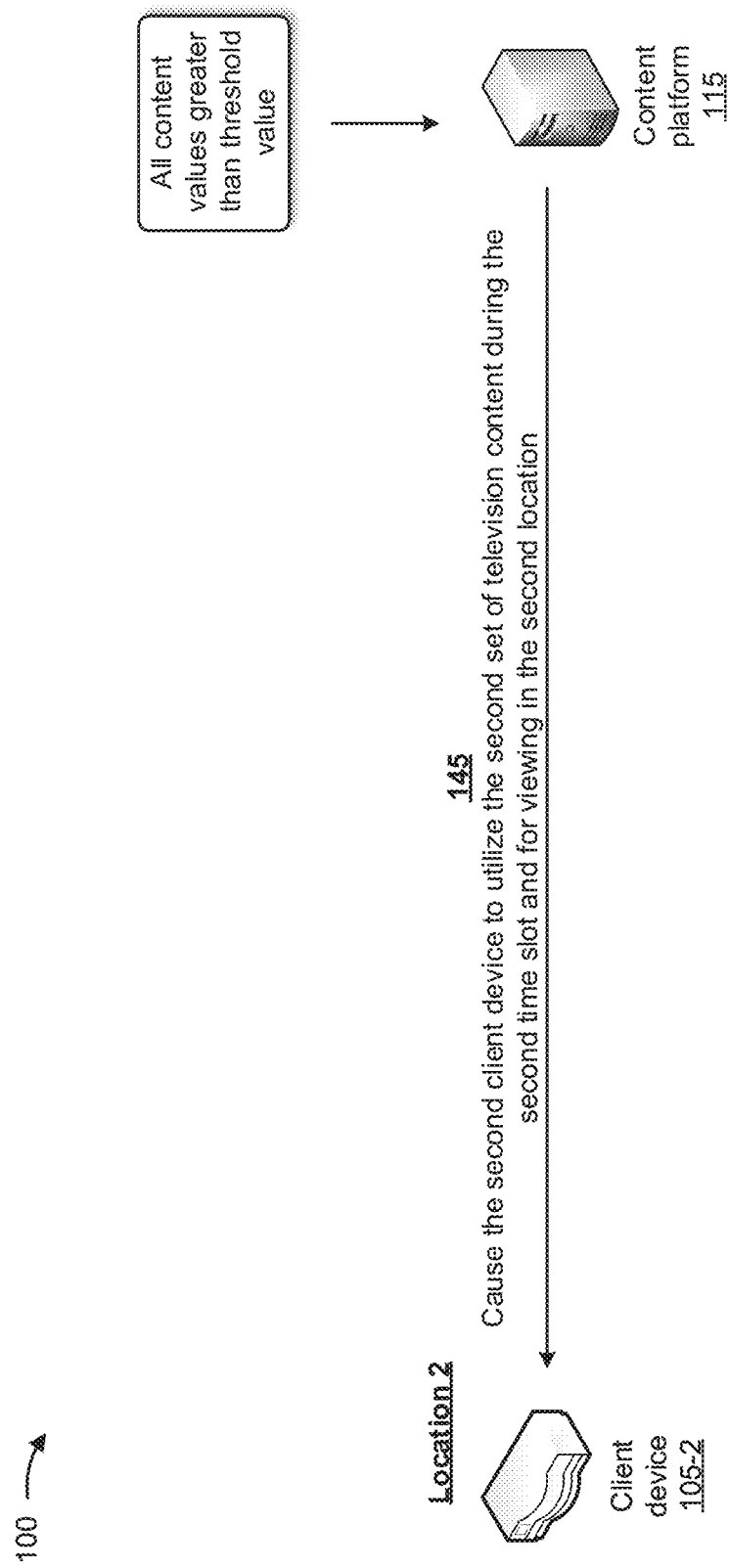

As shown in FIG. 1F, and by reference number 145, content platform 115 may cause second client device 105-2 to utilize the second set of television content during the second time slot and for viewing in the second location. For example, content platform 115 may cause second client device 105-2 to utilize all of the second set of television content (e.g., the fourth television content, the fifth television content, and the sixth television content), without replacing any of the second set of television content, based on determining that the values for all of the television content in the second set of television content satisfy the threshold value. In this case, the values for all of the television content associated with the second available time slot satisfy the threshold value (e.g., six) because the value for the fourth television content (e.g., eight), the value for the fifth television content (e.g., nine), and the value for the sixth television content (e.g., eight) are all greater than the threshold value. In some implementations, the second set of television content may be provided via QAM.

Figure 1G:
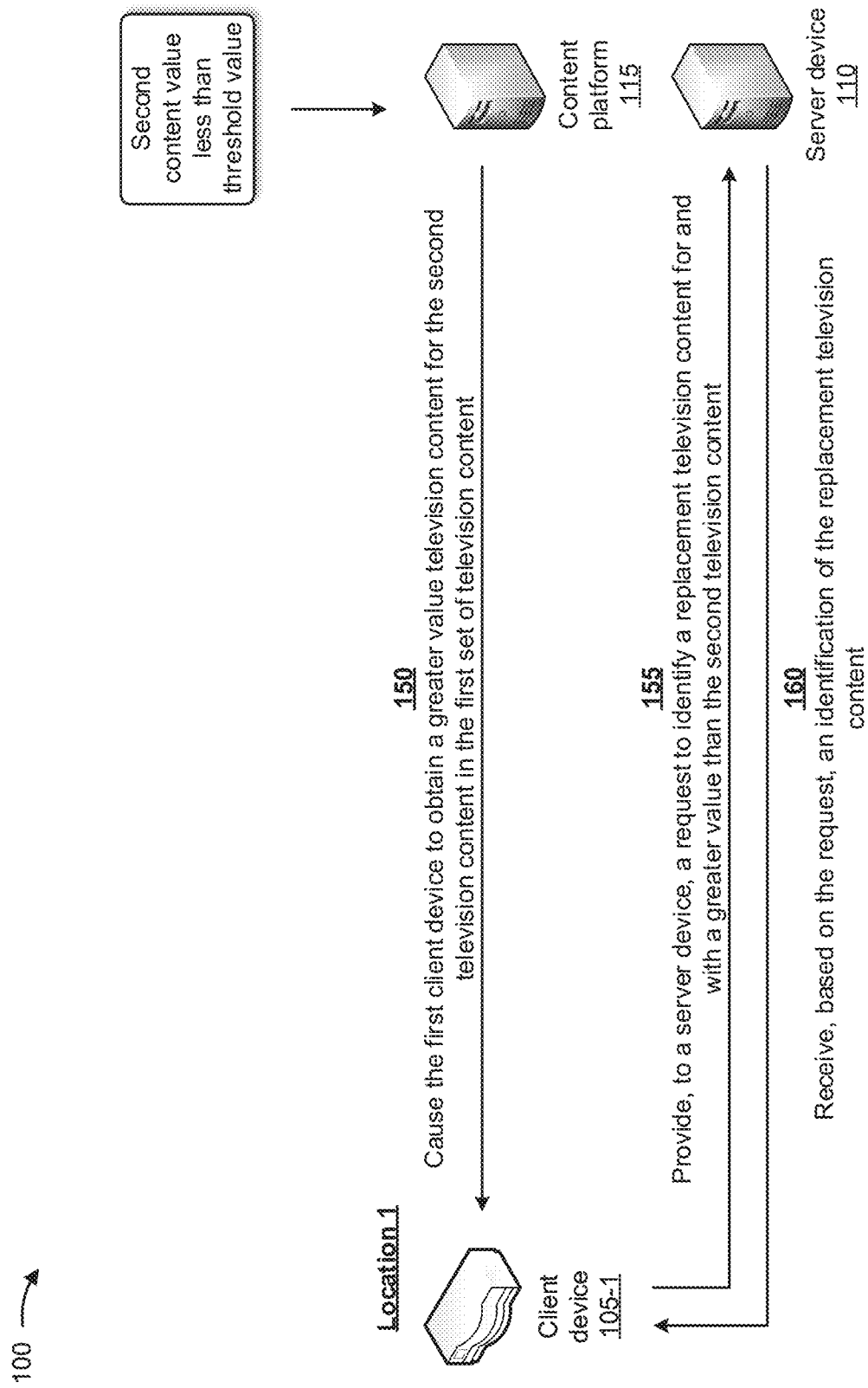

As shown in FIG. 1G, and by reference number 150, content platform 115 may cause first client device 105-1 to obtain a greater value television content for the second television content in the first set of television content. For example, content platform 115 may provide, to first client device 105-1, an instruction to obtain a greater value television content for the second television content because the value of the second television content (e.g. five) fails to satisfy (e.g., is less than) the threshold value (e.g., six).

As further shown in FIG. 1G, and by reference number 155, first client device 105-1 may provide, to server device 110, a request to identify a replacement television content for and with a greater value than the second television content. In some implementations, the request may include information identifying the first location (e.g., location 1), a value assigned to the television content being replaced, content of the television content being replaced, a topic, name, subject, and/or the like of a television program associated with the first time slot, and/or the like. Server device 110 may receive the request to identify the replacement television content, and may identify the replacement television content based on the request. In some implementations, content platform 115 may provide values assigned to replacement television content to server device 110 so that server device 110 may utilize the values to select the replacement television content. Alternatively, or additionally, server device 110 may provide data identifying multiple replacement television content to content platform 115, and content platform 115 may assign values to the multiple replacement television content. In such a situation, server device 110 and/or content platform 115 may identify the replacement television content (e.g., based on the assigned values). Alternatively, or additionally, server device 110 may assign values to the multiple replacement television content in the manner described above. In some implementations, the replacement television content may include a value that is greater than the value assigned to the second television content, that is greater than the threshold value, and/or the like.

As further shown in FIG. 1G, and by reference number 160, first client device 105-1 may receive, based on the request, an identification of the replacement television content. For example, first client device 105-1 may receive, based on the request and from server device 110, content associated with the replacement television content (e.g., as described below in connection with FIG. 1H), may receive an identifier associated with the replacement television content, may receive a location or an address (e.g., an IP address) associated with the replacement television content, and/or the like.

Figure 1H:
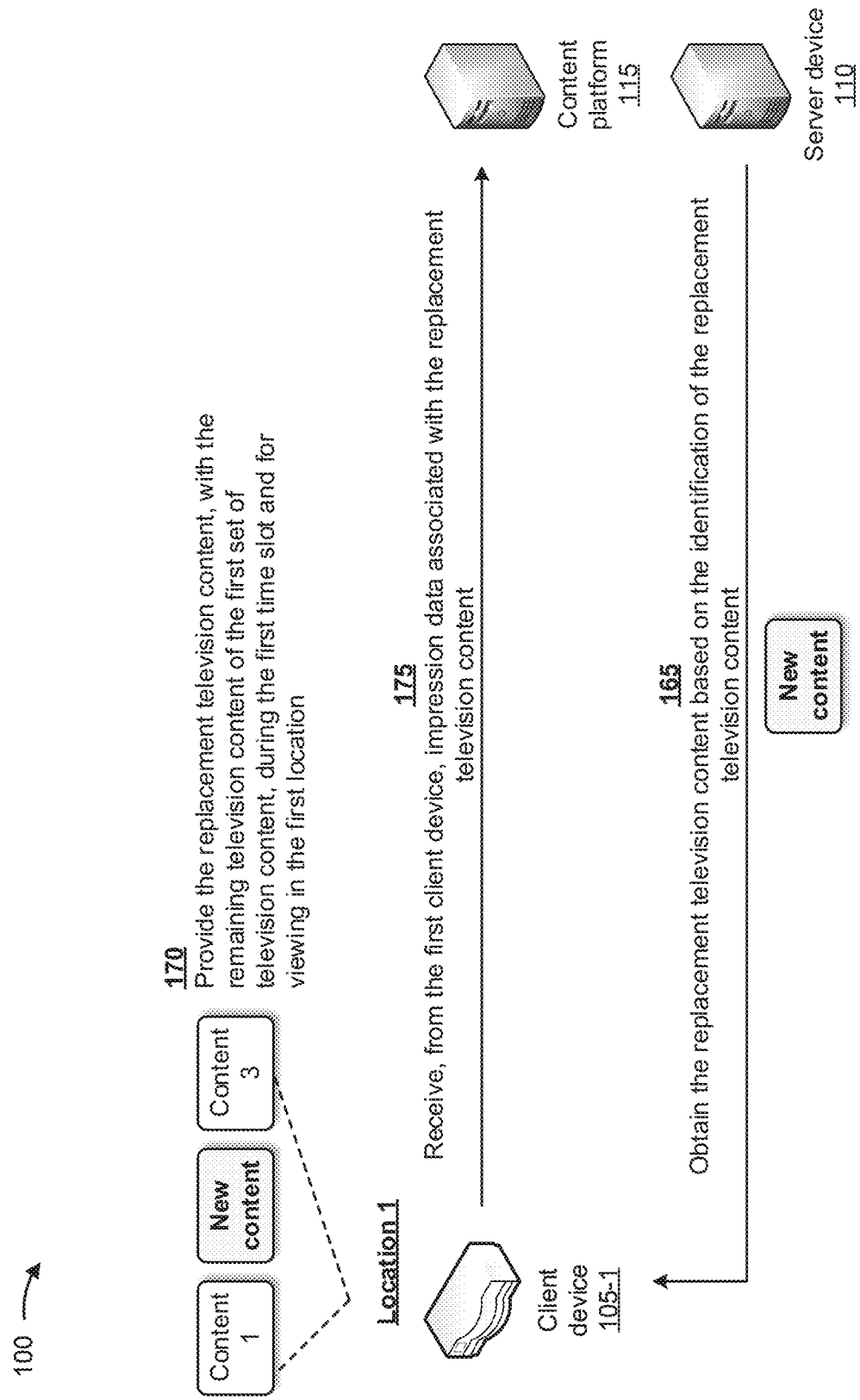

As shown in FIG. 1H, and by reference number 165, first client device 105-1 may obtain the replacement television content based on the identification of the replacement television content. For example, first client device 105-1 may obtain the replacement television content (e.g., New ad) from server device 110. In some implementations, the replacement television content may be received from a streaming content delivery service provided by server device 110. In some implementations, the replacement television content may include Internet protocol-based content that is streamed from the content delivery service. In some implementations, first client device 105-1 may receive the replacement television content from a third-party content server device. In this case, first client device 105-1 may provide information to the third-party content server device (e.g., demographic information, information specific to client device 105-1, a region associated with client device 105-1, and/or the like) to obtain a targeted content based on the information.

In some implementations, rather than obtaining the replacement television content from server device 110, first client device 105-1 may obtain the replacement television content from a storage device provided within first client device 105-1, For example, first client device 105-1 may store one or more potential replacement television content, and may identify the replacement television content from among the potential replacement television content. In some implementations, first client device 105-1 may include a set-top box that may store the potential replacement television content. In some implementations, first client device 105-1 may include or may be associated with a digital video recorder (DVR), and the DVR may store the potential replacement television content, the replacement television content, and/or the like.

In some implementations, a plurality of replacement television content may be stored on first client device 105-1 at a given time and may be replaced from time to time. First client device 105-1 may store a new plurality of television content for each upcoming time slot (e.g., enough television content for the next six hours) and may replace television content for past time slots with television content for future time slots (e.g., a rolling window of replacing old television content with new television content). In some implementations, the television content stored by first client device 105-1 may have already been determined by content platform 115 to have values that satisfy the threshold value. In some implementations, content platform 115 may provide, to first client device 105-1, the model used to assign the values to television content, and first client device 105-1 may utilize the model to assign values to television content stored by first client device 105-1. In some implementations, first client device may be associated with a local server device (e.g., server device 110), along with other client devices 105 in a same geographic location, and the local server device may store the replacement television content on behalf of client devices 105.

In some implementations, content platform 115 may cause, when the value of a television content in the first set of television content fails to satisfy the threshold value, first client device 105-1 to utilize the first set of television content, other than the television content having a value that fails to satisfy the threshold value, during the first time slot and for viewing in the first location. For example, as shown in FIG. 1H and by reference number 170, first client device 105-1 may provide the replacement television content (e.g., New ad) that replaced the second television content, with the remaining television content (e.g., the first television content (e.g., content 1) and the third television content (e.g., content 3)) of the first set of television content. In some implementations, first client device 105-1 may provide the replacement television content via an IP-based stream and may provide the first set of television content, other than the second television content, via QAM. In some implementations, after the replacement television content and the remaining television content are provided, first client device 105-1 may tune to a previously-viewed channel.

As further shown in FIG. 1H, and by reference number 175, content platform 115 may receive, from first client device 105-1, impression data associated with the replacement television content. The impression data may include data identifying a quantity of client devices 105 that presented the replacement content. In some implementations, content platform 115 may update the value associated with the replacement television content based on the impression data. In this way, content platform 115 may continually adjust values of the replacement television content to reflect the most recent information available (e.g., with respect to monetary value of the television content).

Figure 1I:
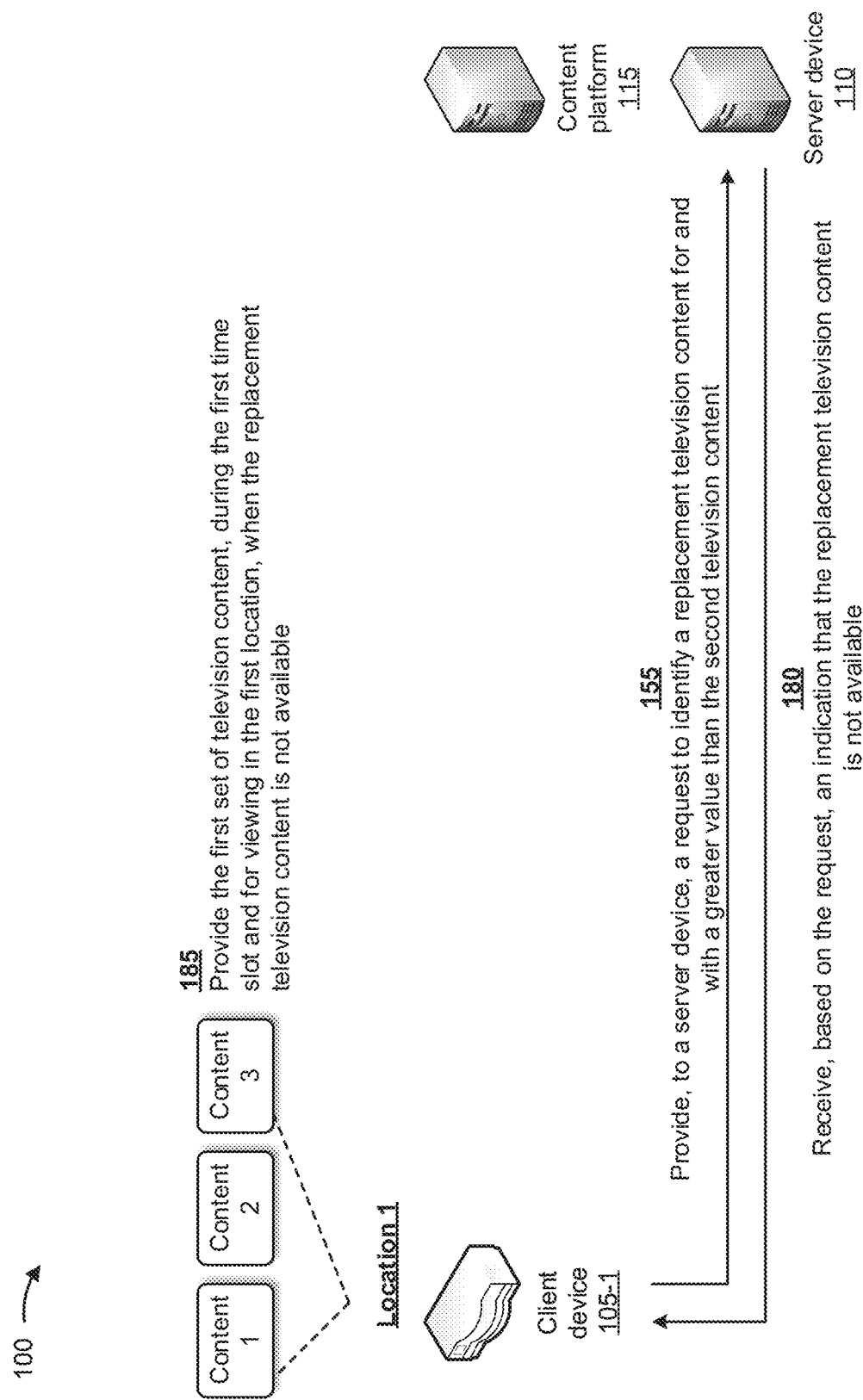

As shown in FIG. 1I, and by reference number 155, first client device 105-1 may provide, to server device 110, the request to identify the replacement television content for and with the greater value than the second television content, as described above in connection with FIG. 1G. As further shown in FIG. 1I, and by reference number 180, first client device 105-1 may receive, from server device 110 and based on the request, an indication that the replacement television content is not available. In some implementations, server device 110 may be unable to identify a replacement television content for the first time slot with a value that is greater the value of the second television content. In such implementations, server device 110 may provide, to first client device 105-1, the indication that the replacement television content is not available. Alternatively, first client device 105-1 may determine that the replacement television content is not available based on other reasons. For example, first client device 105-1 may fail to receive a response from server device 110 due to a network outage or network lag for a network connecting first client device 105-1 and server device 110, an outage or congestion at server device 110, and/or the like.

As further shown in FIG. 1I, and by reference number 185, first client device 105-1 may provide the first set of television content, during the first time slot and for viewing in the first location, when the replacement television content is not available. For example, first client device 105-1 may provide (e.g., via QAM) the first television content, the second television content, and the third television content, of the first set of television content, when the replacement television content is not available since providing a low value television content is better than not providing a television content in a time slot.

In this way, several different stages of the process for value-based provision of content in a hybrid QAM/IP content delivery environment are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that provides value-based content in a hybrid QAM/IP content delivery environment in the manner described herein. Finally, the process for value-based provision of content in a hybrid QAM/IP content delivery environment conserves computing resources, networking resources, and/or the like that would otherwise be wasted in providing low value television content that are not profitable for television programming distributors, providing zero value television content that cost television programming distributors money, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
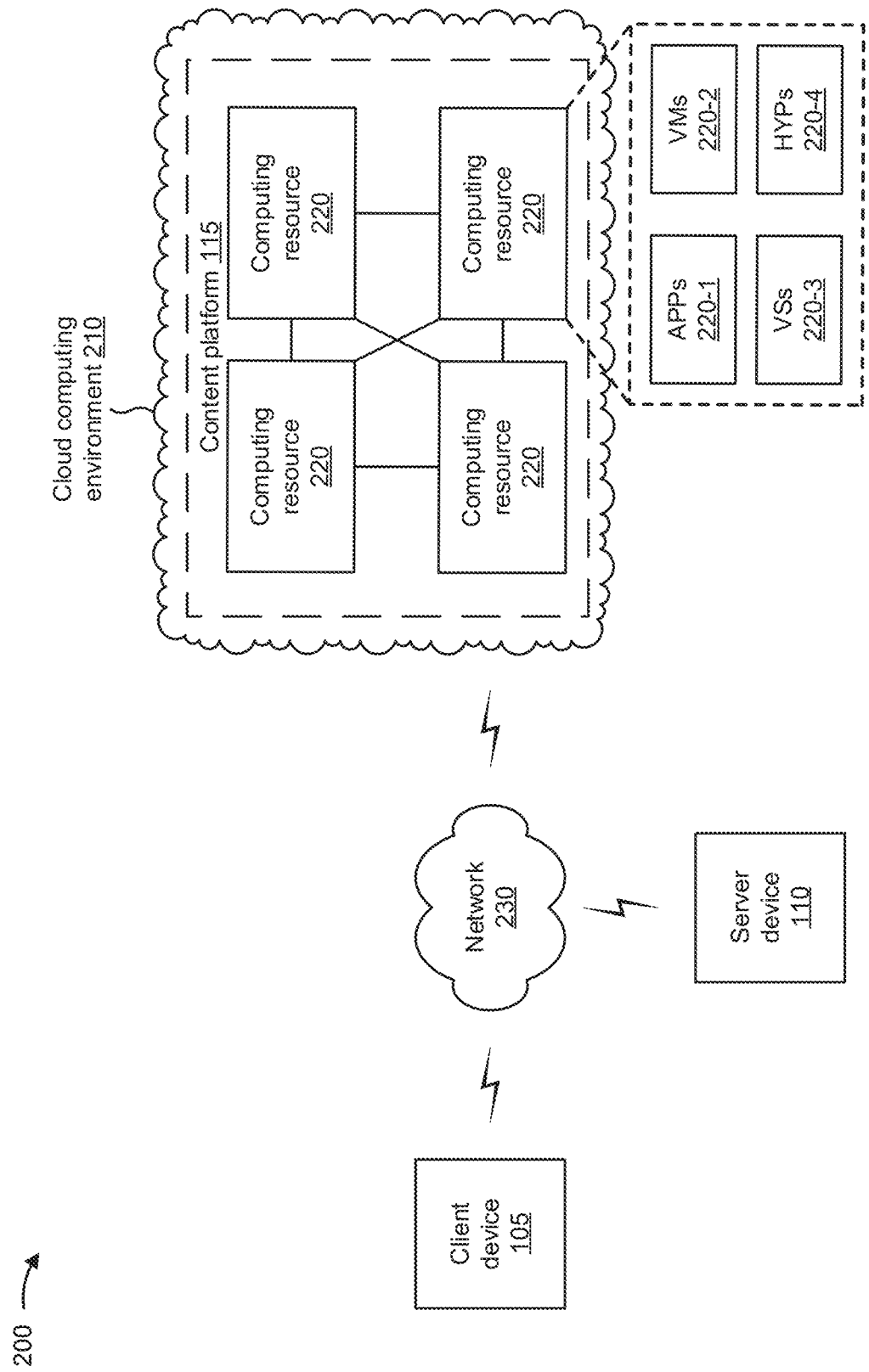
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, server device 110, content platform 115, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a set-top box, a television, a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 105 may receive information from and/or transmit information to server device 110 and/or content platform 115.

Server device 110 includes one or more devices capable of receiving, generating, storing, processing, and/or providing information, as described herein. For example, server device 110 may include a laptop computer, a tablet computer, a desktop computer, a group of server devices, or a similar type of device. In some implementations, server device 110 may receive information from and/or transmit information to client device 105 and/or content platform 115.

Content platform 115 includes one or more devices that provide value-based content in a hybrid QAM/IP content delivery environment. In some implementations, content platform 115 may be designed to be modular such that certain software components may be swapped in or out depending on a particular need. As such, content platform 115 may be easily and/or quickly reconfigured for different uses. In some implementations, content platform 115 may receive information from and/or transmit information to one or more client devices 105 and/or one or more server devices 110.

In some implementations, as shown, content platform 115 may be hosted in a cloud computing environment 210. Notably, while implementations described herein describe content platform 115 as being hosted in cloud computing environment 210, in some implementations, content platform 115 may not be cloud-based (i.e., may be implemented outside of a cloud computing environment) or may be partially cloud-based.

Cloud computing environment 210 includes an environment that hosts content platform 115. Cloud computing environment 210 may provide computation, software, data access, storage, etc., services that do not require end-user knowledge of a physical location and configuration of system(s) and/or device(s) that hosts content platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host content platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with content platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS").

A process virtual machine may execute a single program and may support a single process. In some implementations, virtual machine 220-2 may execute on behalf of a user (e.g., a user of client device 105 or an operator of content platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an content hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
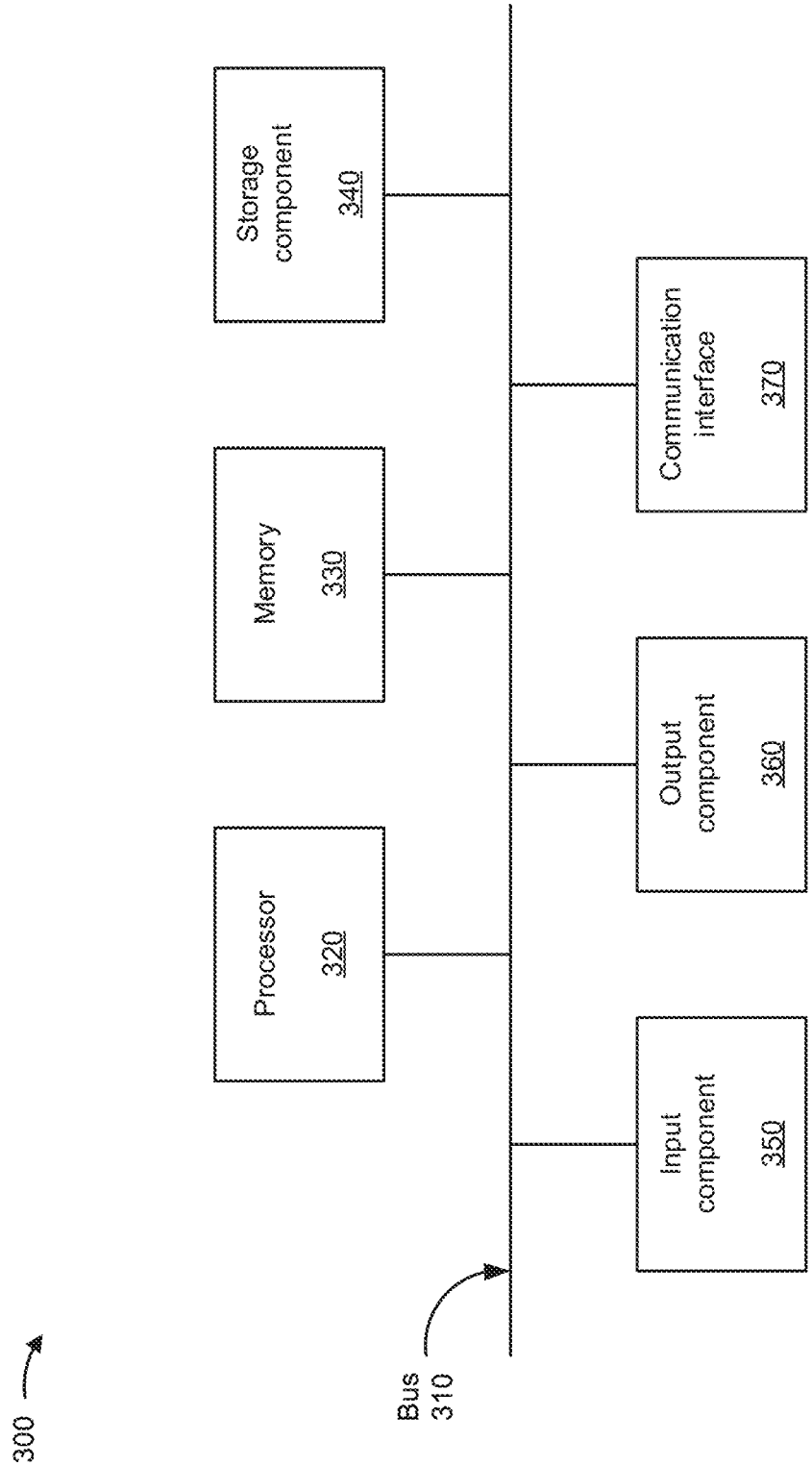
FIG. 3 is a diagram of example components of one or more devices of FIG. 2.

FIG. 3 is a diagram of example components of a device 300. Device 300 may correspond to client device 105, server device 110, content platform 115, and/or computing resource 220. In some implementations, client device 105, server device 110, content platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
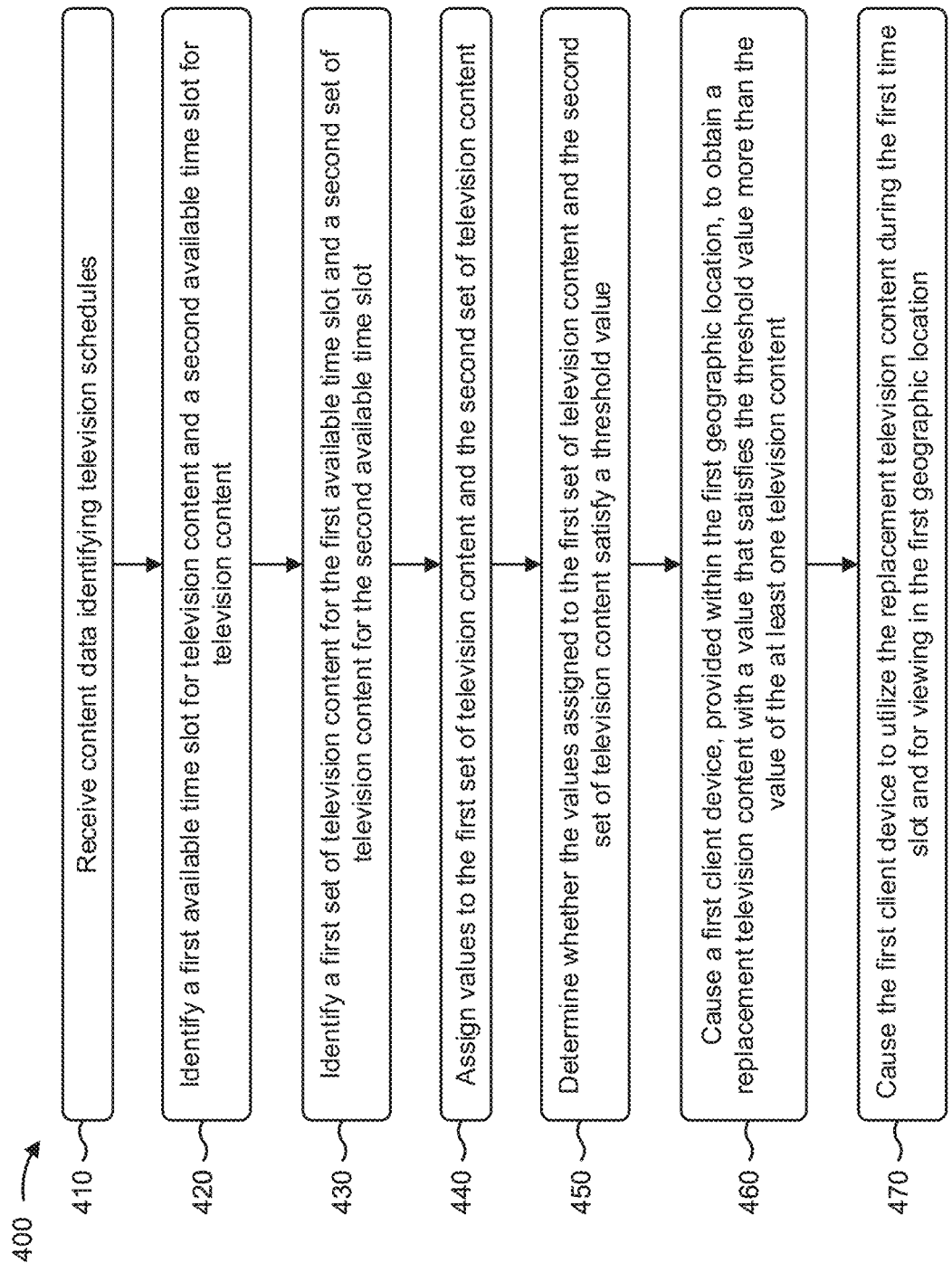
FIG. 4 is a flow chart of an example process for value-based provision of television content in a hybrid quadrature amplitude modulation (QAM)/internet protocol (IP) content delivery environment.

FIG. 4 is a flow chart of an example process 400 for value-based provision of content in a hybrid QAM/IP content delivery environment. In some implementations, one or more process blocks of FIG. 4 may be performed by a device (e.g., content platform 115). In some implementations, one or more process blocks of FIG. 4 may be performed by another device or a group of devices separate from or including the device, such as a client device (e.g., client device 105) and/or a server device (e.g., server device 110).

As shown in FIG. 4, process 400 may include receiving content data identifying television schedules (block 410). For example, the device (e.g., using computing resource 220, processor 320, communication interface 370, and/or the like) may receive content data identifying television schedules for content to be provided for viewing in a first geographic location and a second geographic location, as described above.

As further shown in FIG. 4, process 400 may include identifying a first available time slot for television content and a second available time slot for television content (block 420). For example, the device (e.g., using computing resource 220, processor 320, memory 330, and/or the like) may identify a first available time slot for television content to be provided for viewing in the first geographic location and a second available time slot for television content to be provided for viewing in the second geographic location, as described above.

As further shown in FIG. 4, process 400 may include identifying a first set of television content for the first available time slot and a second set of television content for the second available time slot (block 430). For example, the device (e.g., using computing resource 220, processor 320, storage component 340, and/or the like) may identify a first set of television content for the first available time slot and a second set of television content for the second available time slot, as described above.

As further shown in FIG. 4, process 400 may include assigning values to the first set of television content and the second set of television content (block 440). For example, the device (e.g., using computing resource 220, processor 320, memory 330, storage component 340, and/or the like) may assign values to the first set of television content and the second set of television content, as described above. The values assigned to the first set of television content and the second set of television content may be based a numeric range of values; a cost per one thousand impressions; designations identifying low values, medium values, and high values; and/or the like.

As further shown in FIG. 4, process 400 may include determining whether the values assigned to the first set of television content and the second set of television content satisfy a threshold value (block 450). For example, the device (e.g., using computing resource 220, processor 320, memory 330, and/or the like) may determine whether the values assigned to the first set of television content and the second set of television content satisfy a threshold value, as described above.

As further shown in FIG. 4, process 400 may include causing a first client device, provided within the first geographic location, to obtain a replacement television content with a value that satisfies the threshold value more than the value of the at least one television content (block 460). For example, the device (e.g., using computing resource 220, processor 320, memory 330, storage component 340, communication interface 370, and/or the like) may cause, when a value of at least one television content in the first set of television content fails to satisfy the threshold value, a first client device, provided within the first geographic location, to obtain a replacement television content with a value that satisfies the threshold value more than the value of the at least one television content in the first set of television content, as described above. The replacement television content may be received from a streaming content delivery service or a storage device provided within the first client device. The replacement television content may include Internet protocol-based content that is streamed from a content delivery service.

The first client device may include a set-top box, and a plurality of replacement television content, from which the replacement television content is selected, may be stored in the set-top box.

As further shown in FIG. 4, process 400 may include causing the first client device to utilize the replacement television content during the first time slot and for viewing in the first geographic location (block 470). For example, the device (e.g., using computing resource 220, processor 320, memory 330, storage component 340, communication interface 370, and/or the like) may cause the first client device to utilize the replacement television content during the first time slot and for viewing in the first geographic location, as described above.

Process 400 may include additional implementations, such as any single implementation or any combination of implementations described above, below, and/or in connection with one or more other processes described elsewhere herein.

In some implementations, process 400 may include receiving, from the first client device, impression data associated with the first client device utilizing the replacement television content during the first time slot and for viewing in the first geographic location; and updating the value associated with the replacement television content based on the impression data.

In some implementations, process 400 may include causing a second client device, provided within the second geographic location, to utilize the second set of television content during the second time slot and for viewing in the second geographic location based on determining that values assigned to the second set of television content satisfy the threshold value. The second set of television content may be provided via quadrature amplitude modulation.

In some implementations, the first client device may utilize the first set of television content during the first time slot and for viewing in the first geographic location when the first client device fails to obtain the replacement television content for the at least one television content in the first set of television content.

In some implementations, process 400 may include causing, when the value of the at least one television content in the first set of television content fails to satisfy the threshold value, the first client device to utilize the first set of television content, other than the at least one television content, during the first time slot and for viewing in the first geographic location. The replacement television content may be provided via an Internet protocol-based stream and the first set of television content, other than the at least one television content, may be provided via quadrature amplitude modulation.

In some implementations, a previously-viewed channel may be tuned to after the replacement television content and the first set of television content, other than the at least one television content are provided.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   identifying, by a device, a set of content related to television content and associated with a location, for an available time slot associated with the location;
   causing, by the device and based on determining that a first value associated with first content of the set of content does not satisfy a threshold value, replacement content to be obtained,
     wherein the replacement content is associated with a second value that satisfies the threshold value; and
   causing, by the device, the replacement content to be provided during the available time slot for viewing at the location.

2. The method of claim 1, further comprising:
   receiving data identifying a quantity of devices that presented the replacement content; and
   updating the second value based on the data.

3. The method of claim 1, wherein the replacement content is provided via an Internet protocol-based stream, and
   wherein the set of content, other than the first content, is provided via quadrature amplitude modulation.

4. The method of claim 1, wherein the set of content is a first set of content, the location is a first location, and the available time slot is a first available time slot, and the method further comprising:
   identifying a second set of content, associated with a second location, for a second available time slot associated with the second location;
   assigning values to content of the second set of content; and
   causing, based on determining that the values assigned to the content of the second set of content satisfy the threshold value, the second set of content to be utilized during the second available time slot for viewing at the second location.

5. The method of claim 1, further comprising:
   determining, based on processing data identifying a plurality of content available for the available time slot with a machine learning model, a quantity of content to select for the set of content; and
   selecting, based on the determined quantity, the set of content from the plurality of content.

6. The method of claim 1, wherein the threshold value is a dynamic value that changes based on at least one of:
   a time of day,
   information associated with content programming, or
   a viewing location associated with viewing content data.

7. The method of claim 1, wherein the first value and the second value are determined based on at least one of:
   historical content revenue associated with the content of the set of content,
   information associated with viewership associated with the content of the set of content,
   information identifying target audiences associated with the content of the set of content,
   a cost, or
   information identifying value categories.

8. A device, comprising:
   one or more memories; and
   one or more processors, coupled to the one or more memories, configured to:
     identify a set of content related to television content and associated with a location, for an available time slot associated with the location;
     cause, based on determining that a first value associated with first content of the set of content does not satisfy a threshold value, replacement content to be obtained,
       wherein the replacement content is associated with a second value that satisfies the threshold value; and
     cause the replacement content to be provided during the available time slot for viewing at the location.

9. The device of claim 8, wherein the one or more processors are further configured to:
   receive data identifying a quantity of devices that presented the replacement content; and
   update the second value based on the data.

10. The device of claim 8, wherein the replacement content is provided via an Internet protocol-based stream, and
    wherein the set of content, other than the first content, is provided via quadrature amplitude modulation.

11. The device of claim 8, wherein the set of content is a first set of content, the location is a first location, and the available time slot is a first available time slot, and
    wherein the one or more processors are further configured to:
      identify a second set of content, associated with a second location, for a second available time slot associated with the second location;
      assign values to content of the second set of content; and
      cause, based on determining that the values assigned to the content of the second set of content satisfy the threshold value, the second set of content to be utilized during the second available time slot for viewing at the second location.

12. The device of claim 8, wherein the set of content is a first set of content, and
    wherein the one or more processors are further configured to:
      replace the first content with the replacement content; and
      cause a second set of content to be provided during the available time slot at the location,
        wherein the second set of content includes the replacement content and content of the first set of content.

13. The device of claim 8, wherein the one or more processors are further configured to:
    determine, based on processing data identifying a plurality of content available for the available time slot with a machine learning model, a quantity of content to select for the set of content; and
    select, based on the determined quantity, the set of content from the plurality of content.

14. The device of claim 8, wherein the threshold value is a dynamic value that changes based on at least one of:

a time of day, information associated with content programming, or a viewing location associated with viewing content data.

15. A non-transitory computer-readable medium storing a set of instructions, the set of instructions comprising:

one or more instructions that, when executed by one or more processors of a device, cause the device to:

identify a set of content related to television content and associated with a location, for an available time slot associated with the location;

cause, based on determining that a first value associated with first content of the set of content does not satisfy a threshold value, replacement content to be obtained, wherein the replacement content is associated with a second value that satisfies the threshold value; and cause the replacement content to be provided during the available time slot for viewing at the location.

16. The non-transitory computer-readable medium of claim 15, wherein the one or more instructions further cause the device to:

receive data identifying a quantity of devices that presented the replacement content; and update the second value based on the data.

17. The non-transitory computer-readable medium of claim 15, wherein the replacement content is provided via an Internet protocol-based stream, and wherein the set of content, other than the first content, is provided via quadrature amplitude modulation.

18. The non-transitory computer-readable medium of claim 15, wherein the set of content is a first set of content, the location is a first location, and the available time slot is a first available time slot, and wherein the one or more instructions further cause the device to:

identify a second set of content, associated with a second location, for a second available time slot associated with the second location;

assign values to the second set of content; and cause, based on determining that the values assigned to the content of the second set of content satisfy the threshold value, the second set of content to be utilized during the second available time slot for viewing at the second location.

19. The non-transitory computer-readable medium of claim 15, wherein the set of content is a first set of content, and wherein the one or more instructions further cause the device to:

replace the first content with the replacement content; and cause a second set of content to be provided during the available time slot at the location, wherein the second set of content includes the replacement content and content of the first set of content.

20. The non-transitory computer-readable medium of claim 15, wherein the one or more instructions further cause the device to:

determine, based on processing data identifying a plurality of content available for the available time slot with a machine learning model, a quantity of content to select for the set of content; and select, based on the determined quantity, the set of content from the plurality of content.

* * * * *